T. MORSKI.
SHOCK ABSORBER AND SUSPENSION FOR VEHICLES.
APPLICATION FILED APR. 15, 1918.

1,290,293.

Patented Jan. 7, 1919.
2 SHEETS—SHEET 1.

Thomas Morski, INVENTOR

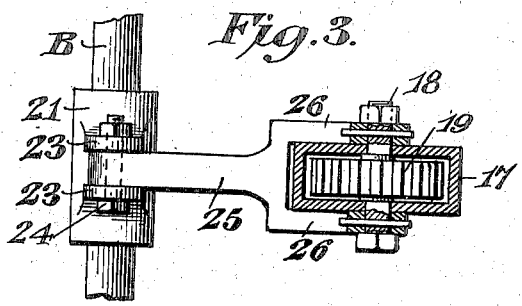
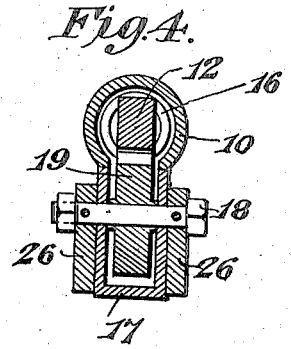
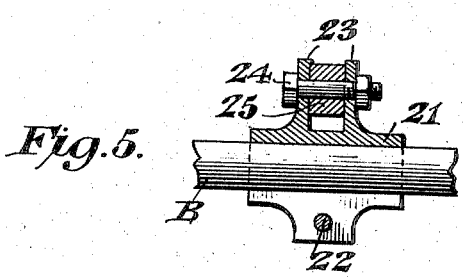
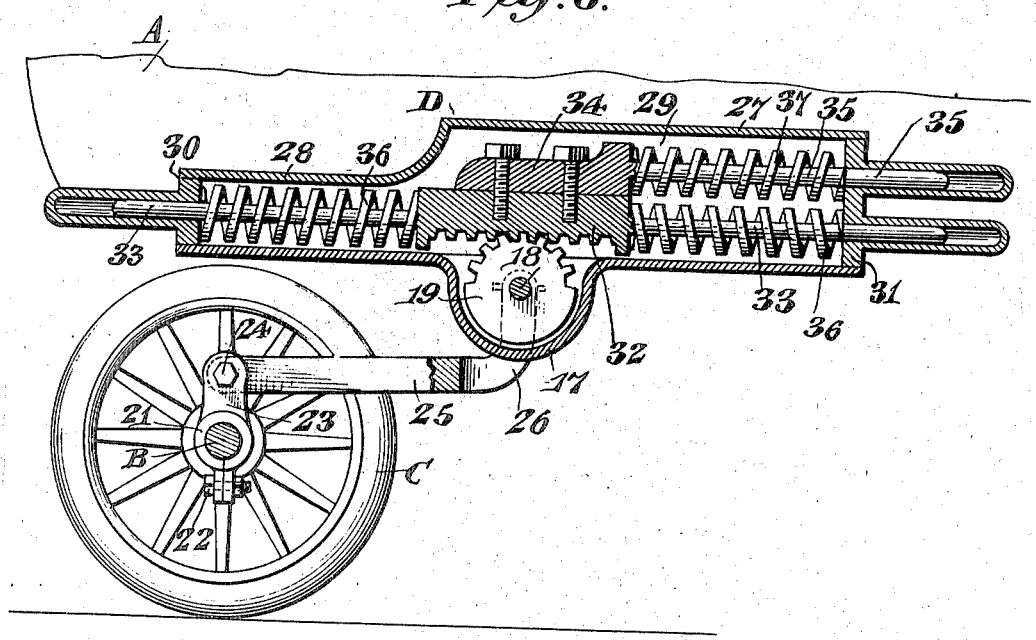

UNITED STATES PATENT OFFICE.

THOMAS MORSKI, OF MANISTEE, MICHIGAN, ASSIGNOR TO AMERICAN MOTOR SPRING PATENTS COMPANY, A CORPORATION OF DELAWARE.

SHOCK-ABSORBER AND SUSPENSION FOR VEHICLES.

1,290,293.   Specification of Letters Patent.   Patented Jan. 7, 1919.

Application filed April 15, 1918. Serial No. 228,671.

*To all whom it may concern:*

Be it known that I, THOMAS MORSKI, a citizen of Russia, residing at Manistee, in the county of Manistee and State of Michigan, have invented a new and useful Shock-Absorber and Suspension for Vehicles, of which the following is a specification.

The invention relates to vehicle springs, and more particularly to the class of attachments for vehicles for service as springs and shock absorbers.

The primary object of the invention is the provision of an attachment of this character, wherein the impact and the rebounding action between the wheels and the body of a vehicle will be taken care of, so as to absorb the same, and thereby relieve the vehicle from sudden shocks and jars, and thus increase the longevity thereof.

Another object of the invention is the provision of an attachment of this character, wherein the body of the vehicle is supported upon the same, so that said attachment will serve as springs therefor, and the arrangement and coaction of its parts are such as to render the same noiseless and to assure the absorbing of shocks and jars incident to the travel of the vehicle.

A further object of the invention is the provision of an attachment of this character, wherein the vertical movement of either the axle or body of the vehicle is yieldingly resisted in a novel manner without excessive strain, the attachment being novel in form to permit the application thereof to the vehicle, and the use of the ordinary elliptical springs is eliminated.

A still further object of the invention is the provision of an attachment of this character which is comparatively simple in construction, possessing few parts, which are readily accessible, thoroughly reliable, and efficient in operation, strong, durable and inexpensive in manufacture and installation.

The invention will be best understood from a consideration of the following detail description, taken in connection with the accompanying drawings forming part of this specification, with the further understanding that while the drawings show a practical form of the invention, the latter is not confined to any strict conformity with the showing of the drawings, but may be changed and modified so long as such changes and modifications come within the scope of the appended claims.

In the accompanying drawings:

Fig. 3 is a sectional view approximately on the line 3—3 of Fig. 1, looking in the direction of the arrow.

Fig. 4 is a sectional view on the line 4—4 of Fig. 1, looking in the direction of the arrow.

Fig. 5 is a sectional view on the line 5—5 of Fig. 1.

Fig. 6 is a view similar to Fig. 2, showing a slight modification of the invention.

Similar reference characters indicate corresponding parts throughout the several views in the drawings.

In constructing a practical embodiment of the invention in accordance with the illustrated example, there is shown a portion of the body A, the rear axle B, and the wheels C of an automobile of any ordinary and well known construction, the rear axle B being held in its proper relation by the usual radius rods, not shown, while D indicates generally the vehicle springs or attachment hereinafter fully described.

Figure 1:
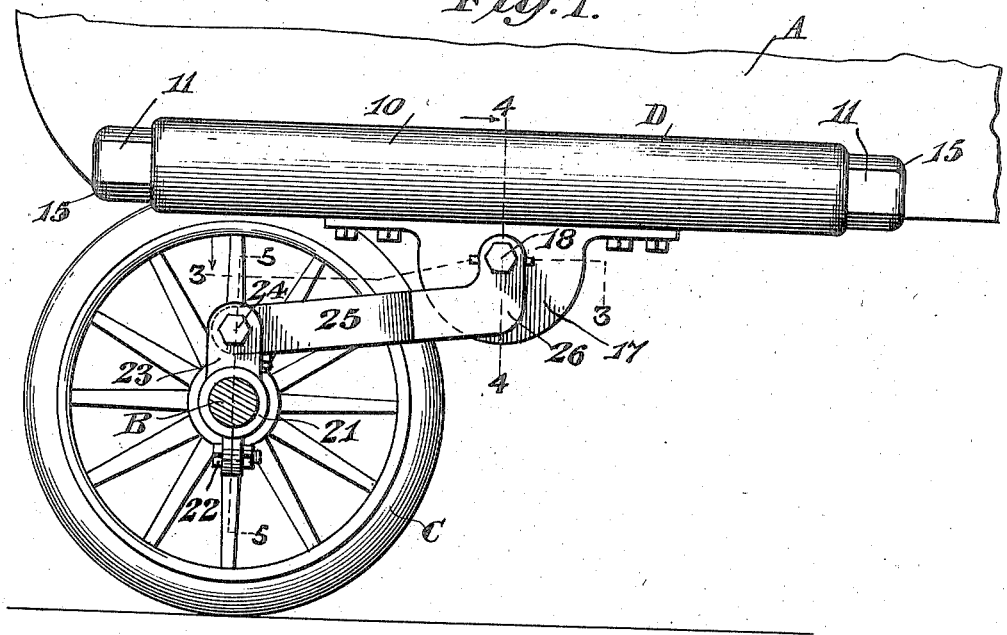
Figure 1 is a fragmentary elevation of a vehicle, showing only the rear axle in vertical section, and a portion of the body with the attachment constructed in accordance with the invention applied.
Figure 2:
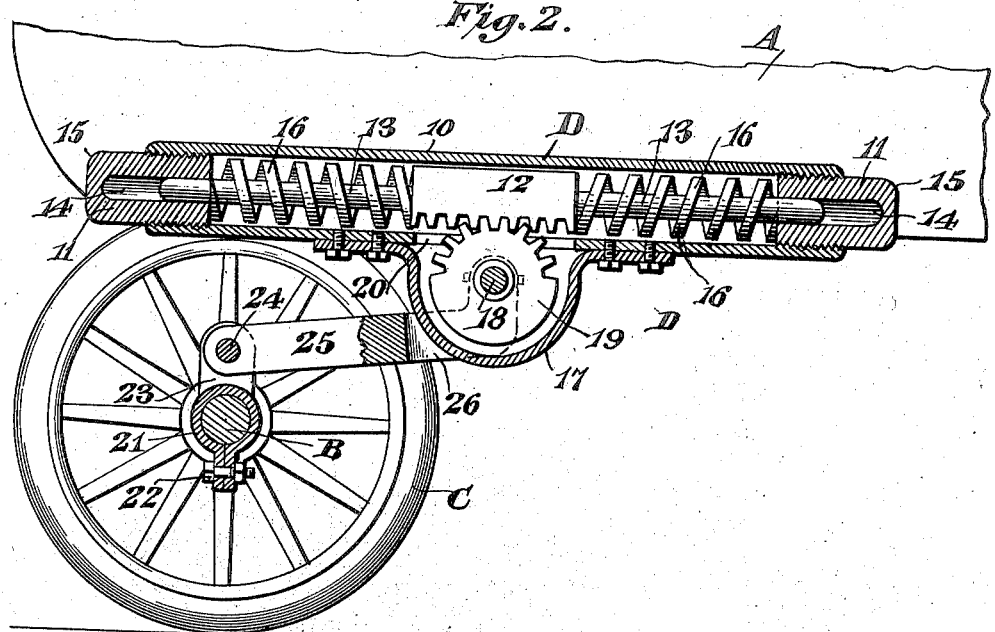
Fig. 2 is a vertical longitudinal sectional view through the attachment.

The vehicle spring or attachment D comprises a cylinder 10, preferably of uniform cross sectional diameter throughout its length having internally threaded ends for detachable and adjustable engagement therewith of externally threaded caps 11 to close the opposite ends of the cylinder 10. The latter contains or has arranged therein a reciprocatory toothed rack 12, which is of the required length, preferably as shown in Fig. 2 of the drawings, and is formed at opposite ends with longitudinally alining guide rods or stems 13, which fit in sockets 14 formed in the caps 11. At their outer ends the caps 11 are preferably rounded as at 15, the sockets 14 being correspondingly shaped to the rods or stems 13 and are of a length to permit the reciprocation of the rack 12 when movement is imparted thereto, Surrounding the rods or stems 13 at opposite sides of the rack 12 are coiled compression springs 16, which have their ends working against the rack 12 and the caps 11, the springs 16 being of a tension to normally hold the rack 12 at a neutral point, substantially medially in the cylinder 10. However when motion is imparted to the rack 12, the same will move longitudinally within the cylinder 10 against the resistance of the springs thus coacting with the same to absorb shocks and jars incident to the travel of the vehicle.

At the neutral point of location of the rack 12 and fixed to and depending from the underside of the cylinder 10 is a gear casing 17, in which is journaled a transverse shaft 18, which interiorly of the casing 17 carries a segment toothed gear 19. The teeth of gear 19 mesh with the teeth of the rack 12, the cylinder 10 being cut away at 20 to form a clearance for the gear 19, as is clearly shown in Fig. 2 of the drawings.

Fixed to the axle B is a split bearing sleeve 21, which is detachably bolted as at 22 thereto, and is formed with the upstanding spaced parallel bearing ears 23. Between the ears 23 is pivoted the rear end of the arm 25 by a bolt 24 of a forked lever, the fork 26 of which straddles the gear casing 17, and has its limbs of substantially L-shape fixed to the transverse shaft 18 journaled in the gear casing 17, and carrying the gear 19. Hence on vertical movement of the body A and axle B, the forked lever will be rocked thus imparting movement to the gear 19, which causes the reciprocation of the rack 12, against the resistance of the spring 16 to absorb the shock or jar imparted to the vehicle. It will be seen that this movement is yieldingly resisted to relieve both the impact of the shock and the rebounding action to the vehicle.

In Fig. 6 of the drawings, there is shown a slight modification of the invention, wherein the cylinder 27 is preferably of the shape shown therein, formed with the small and larger portions 28 and 29, respectively. Closing the ends of these portions are the respective single and double guide caps 30 and 31, while within the cylinder 27 is the reciprocatory rack 32 formed at opposite ends with the guide rods or stems 33. These last are in longitudinal alinement and work within the single and double guide caps. Bolted or otherwise fastened upon the rack 32 is a saddle 34 having a stem 35, which projects forwardly and is parallel with the rod or stem 33 next thereto on the rack 32, the rod or stem 35 being designed to work within the double guide cap 31. Surrounding the rods or stems 33 are the coiled compression springs 36, which work against said caps and the rack 32, and likewise surrounding the rod or stem 35 is the auxiliary compression spring 37, which works against the saddle 34 and the double guide cap 31 to augment one of the springs 33 in the action of the shock absorber.

It will be noted that the spring 33 forwardly of the rack 32 and the auxiliary spring 37 coöperate to yieldingly resist the impact of the shock imparted to the axle or body of the vehicle, while the other spring 36 at the rear of the rack 32 yieldingly resists the rebounding action in the operation of the shock absorber.

Lubricant is introduced into either of the cylinders 10 or 27 for the oiling of the parts working therein, the caps being sufficiently tight to retain oil within the cylinders. If found desirable, suitable oil cups can be provided for the supplying of oil to the cylinders of the shock absorber.

Both the preferred and modified forms of the attachment will serve as springs for the vehicle, and in the operation thereof the springs 16, 36 and 37 in the forward ends of the cylinders, will be sufficiently strong to support the weight of the body of the vehicle and the load it contains, or practically so. That is to say, the toothed rack 12, or 32, will be held at a central or neutral point in the cylinder when the car is at rest without a load. The load, when placed in the vehicle, will tend to lower the cylinder thereby compressing the spring 16 or the springs 36 and 37 in the forward end of said cylinder, to a slight degree, and these springs will sustain the body and its load.

Now, when the wheels C strike an obstruction along the road, the said wheels jump upwardly which causes the upward movement of the lever 25, moving the gear 19 therewith, which acts upon the rack causing the latter to move forwardly in the cylinder against the resistance of the spring or springs in the front end of said cylinder. The spring or springs resist the thrust and tend to force back the rack 12 to normal position, which is either central or at a neutral point within the cylinder.

It is contemplated within the scope or embodiment of the invention to mount the arms 25 rearwardly of the axle B, or in other wards reverse the position of the arms, which would extend backwardly of the axle so that the operation of the attachment would be the reversal of the action thereof hereinbefore set forth.

From the foregoing, it is thought that the construction and manner of operation of the invention will be clearly understood, and therefore, a more extended examination has been omitted.

What is claimed is:—

1. An attachment for vehicles, comprising a cylinder fixed to the frame of said vehicle, an oppositely tensioned member reciprocatively held in the cylinder, a toothed gear engaging said member, and an arm fixed to the gear at the axis thereof and pivotally connected with the axle of the vehicle.

2. An attachment for vehicles, comprising a cylinder fixed to the frame of said vehicle, an oppositely tensioned member reciprocatively held in the cylinder, a toothed gear engaging said member, an arm fixed to the gear at the axis thereof and pivotally connected with the axle of the vehicle, and guide caps closing the ends of said cylinder and supporting the tensioned member.

3. An attachment for vehicles, comprising a cylinder fixed to the frame of said vehicle, an oppositely tensioned member reciprocatively held in the cylinder, a toothed gear engaging said member, an arm fixed to the gear at the axis thereof and pivotally connected with the axle of the vehicle, guide caps closing the ends of said cylinder and supporting the tensioned member, and an inclosure for said gear.

4. An attachment comprising in combination a cylinder, a reciprocatory toothed rack interiorly thereof and having stems projecting from the opposite ends, caps on the ends of the cylinder and receiving the stems, coiled compression springs surrounding the stems and working against said rack, a toothed gear meshing with the rack, and an arm fixed to the gear for moving the latter.

5. An attachment comprising in combination a cylinder, a reciprocatory toothed rack interiorly thereof and having stems projecting from the opposite ends, adjustable caps on the ends of the cylinder and receiving the stems, coiled compression springs surrounding the stems and working against said rack and said caps, a toothed gear meshing with the rack, an arm fixed to the gear for moving the latter, and a casing on the cylinder inclosing the gear.

6. An attachment comprising in combination a cylinder, a reciprocatory toothed rack interiorly thereof and having stems projecting from the opposite ends, caps on the ends of the cylinder and receiving the stems, coiled compression springs surrounding the stems and working against said rack, a toothed gear meshing with the rack, an arm fixed to the gear for moving the latter, and a casing on the cylinder inclosing the gear, said arm being forked to straddle the casing.

7. An attachment comprising in combination a cylinder, a reciprocatory toothed rack interiorly thereof and having stems projecting from the opposite ends, caps on the ends of the cylinder and receiving the stems, coiled compression springs surrounding the stems and working against said rack, a toothed gear meshing with the rack, an arm fixed to the gear for moving the latter, a casing on the cylinder inclosing the gear, said arm being formed to straddle the casing, and a bearing for pivotally connecting the arm to an axle.

8. An attachment for vehicles comprising a cylinder, a rack reciprocable in the cylinder, springs coacting on opposite ends of the rack to hold the same in neutral position within the cylinder, a toothed gear meshing with said rack, and an arm fixed to said gear at its axis and pivotally connected with an axle of the vehicle.

9. An attachment for vehicles comprising a cylinder, an oppositely tensioned rack reciprocable in the cylinder, a gear having teeth extending partway around its circumference, said teeth meshing with the teeth of the rack, an L-shaped arm fixed at one end to the gear at its axis, and a pair of ears rising from an axle of the vehicle and pivotally holding the opposite end of said arm.

10. An attachment for vehicles comprising a casing, a rack and gear within the casing, an arm secured to the gear at its axis and pivotally connected with an axle of the vehicle, and tensioning means acting on each end of the rack to hold the same in a neutral position and to maintain the body of the vehicle in a normal position with respect to said axle.

In testimony, that I claim the foregoing as my own, I have hereto affixed my signature in the presence of two witnesses.

THOMAS MORSKI.

Witnesses:
JOHN AUSTIN,
THOS. SMURTHWAITE.